(12) United States Patent
Lee

(10) Patent No.: US 6,445,931 B1
(45) Date of Patent: Sep. 3, 2002

(54) COMPOSITE INTERFACE APPARATUS FOR KEY TELEPHONE SYSTEM

(75) Inventor: Haeng Yeoun Lee, Choongcheongbuk-Do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/471,487

(22) Filed: Dec. 23, 1999

(30) Foreign Application Priority Data

Dec. 26, 1998 (KR) .............................. 98-58962

(51) Int. Cl.$^7$ .............................. H04B 7/38; H04M 7/00
(52) U.S. Cl. ...................... 455/555; 455/557
(58) Field of Search ................ 455/557, 422, 455/560, 554–555; 379/90.01, 198

(56) References Cited

U.S. PATENT DOCUMENTS 4,942,601 A * 7/1990 Park
5,511,111 A * 4/1996 Serbetcioglu et al.
RE37,141 E * 4/2001 O'Sullivan
6,308,062 B1 * 10/2001 Chien et al.

* cited by examiner

Primary Examiner—Nguyen T. Vo
(74) Attorney, Agent, or Firm—Fleshner & Kim, LLP

(57) ABSTRACT

A hybrid interface apparatus for a key telephone system is disclosed, which apparatus is capable of interfacing a data and voice communication between a terminal such as a key telephone, a mobile telephone, a computer, etc. and a key telephone system. The hybrid interface apparatus according to the present invention includes more than at least one key telephone unit, a main apparatus for connecting the key telephones, a personal computer, and a multi-module connected between the main apparatus and a key telephone unit, a mobile telephone and a personal computer for interfacing a wire-based communication, a wireless communication and a data communication.

17 Claims, 2 Drawing Sheets

COMPOSITE INTERFACE APPARATUS FOR KEY TELEPHONE SYSTEM

BACKGROUND OF THE INVENTION

1. Field of the Invention

The present invention relates to an interface apparatus for a key telephone system, and in particular to a composite interface apparatus for a key telephone system which is capable of interfacing a data and voice communication between a terminal such as a key telephone, a mobile telephone, a computer, etc. and a key telephone system.

2. Description of the Background Art

Generally, a keyphone system represents a key telephone system. The key telephone system includes a plurality of keyphones, and an apparatus for connecting the keyphones. Each keyphone includes a line selection button for commonly using a telephone line.

As shown in FIG. 1, a conventional key telephone system includes a main apparatus 100 and a key telephone unit (KTU) 102. The KTU 102 includes a digital adapter subscriber loop IC hereinafter called DASL) and is connected with a DASL 10 of the main apparatus. Therefore, a voice communication is performed between the main apparatus 100 and the KTU 102 through a DASL.

Recently, as a wireless communication and a computer communication are rapidly advanced, the needs for a voice communication as well as a wireless communication and a data communication are increased. However, in the conventional keyphone system, since only a voice communication is available, it is impossible to satisfy user's various demands.

In addition, in the conventional keyphone system, in order to implement a wireless communication and a data communication, an apparatus is additionally needed, so that it is inconvenient to use the system, and the fabrication cost of the system is increased.

SUMMARY OF THE INVENTION

Accordingly, it is an object of the present invention to provide a hybrid interface apparatus for a keyphone system which is capable of interfacing a data and voice communication between a terminal such as a key telephone, a mobile telephone, a computer, etc. and a key telephone system.

It is another object of the present invention to provide a hybrid interface apparatus for a keyphone system in which a mobile telephone and a computer are available, and a voice and data transmission is available.

It is still another object of the present invention to provide a multi-module of a hybrid interface function for easily connecting a keyphone, a mobile telephone and a computer to a conventional keyphone system.

To achieve the above object, there is provided a hybrid interface apparatus which includes more than at least one key telephone unit, a main apparatus for connecting the key telephones, a personal computer, and a multi-module connected between the main apparatus and a key telephone unit, a mobile telephone and a personal computer for interfacing a wire-based communication, a wireless communication and a data communication.

To achieve the above objects, there is provided a multi function module which includes first and second digital adapter subscriber loop(DASL) ICs for transmitting and receiving a voice signal and a data signal with the main apparatus and the KTU in an AMI signal format, a RF module for transmitting and receiving a high frequency signal with a mobile telephone, a series interface for transmitting and receiving a data with a PC(Personal Computer), first and second CODECs connected with the first and second DASL ICs, an analog switch connected between the first and second CODECs and the RF module for switching a voice signal of the first CODEC to the second CODEC and the RF module and switching the voice signals of the second CODEC and the RF module to the first CODEC, and a CPU(Central Processing Unit) for searching a header information of the data signal outputted from the first DASL, controlling the analog switch, carrying a header information on the data signals which are outputted from the second DASL, the RF module, and the series interface to the first DASL.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 2:
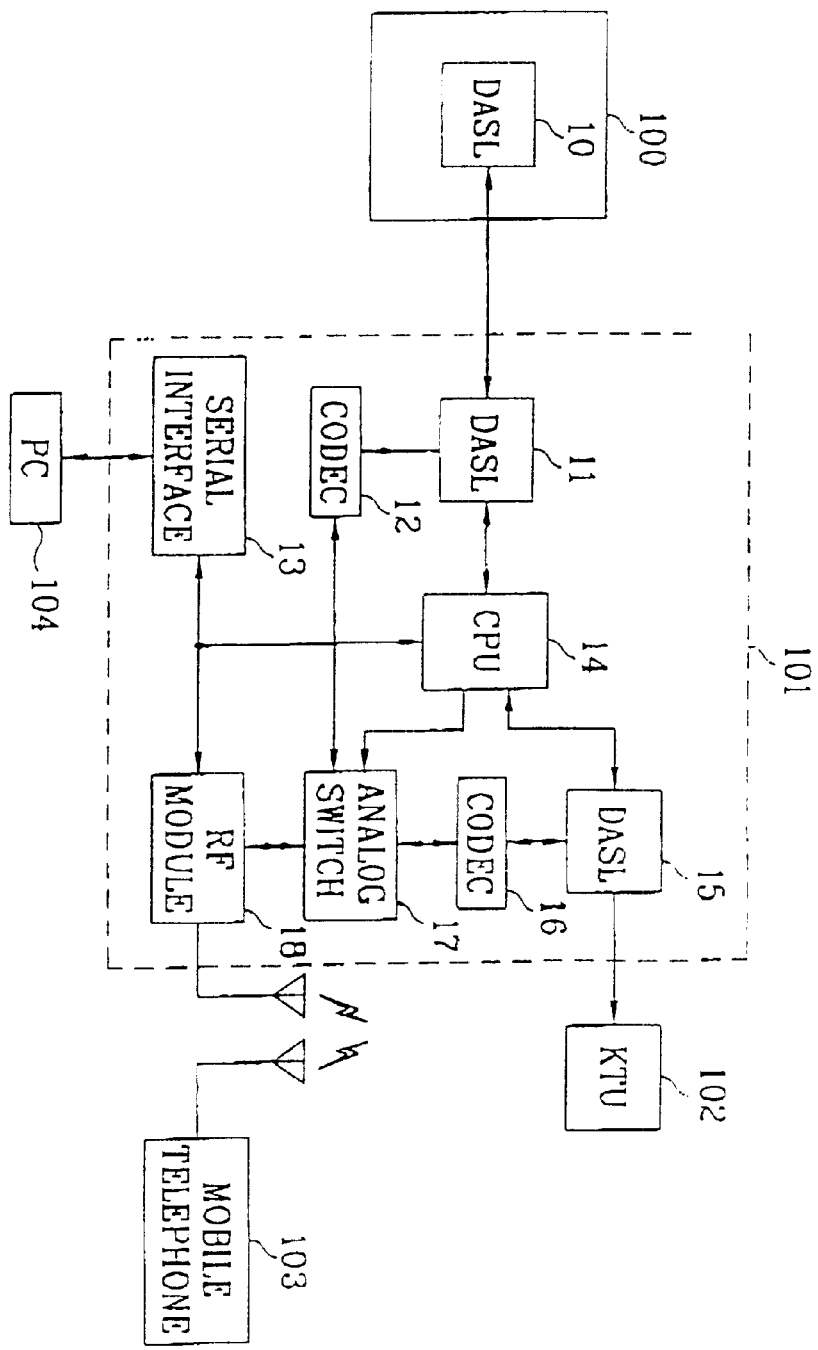
FIG. 2 is a block diagram illustrating a composite interface apparatus for a keyphone system according to the present invention.

As shown in FIG. 2, a composite interface apparatus for a keyphone system according to the present invention includes a main apparatus 100, a multi-module 101, a mobile telephone 103, and a personal computer (PC) 104.

The multi-module 101 interfaces a voice communication and a data communication between the KTU 102, the mobile telephone 103, the PC 104, and the main apparatus 100.

The multi-module 101 includes a DASLs 11 and 15 for transmitting and receiving an alternate mark inversion(AMI) signal to/from a DASL 10 of the main apparatus 100 or a DASL(not shown) of the KTU 102 using a 2B+D channel structure, respectively. Each of the DASLs 11 and 15 codes a data signal and a voice signal into an AMI signal or decodes the AMI signal into a data signal and a voice signal. In addition, the multi-module 101 includes a CPU(Central Processing Unit) 14, a series interface 13, CODECs 12 and 16, an analog switch 17, and a RF module 18.

The CODECs(Coder and Decoder) 12 and 16 performs a conversion operation between a digital voice signal and an analog voice signal, and the CPU 14 judges whether a corresponding data is transmitted to the KTU 102 based on a header information of the data decoded by the DASL 11 or is transmitted to the PC 104 or is transmitted to the mobile telephone 103. In addition, the CPU 14 receives a data from the DASL 15 or the RF module 18, and carries a header information which represents whether a corresponding data is the data of the KTU 102 or the mobile telephone 103 or the PC 104.

The analog switch 17 switches an analog voice signal outputted from the CODEC 12 to the RF module 18 or the CODEC 16 in accordance with a control of the CPU 14 or switches an analog voice signal, which is outputted from the RF module 18, to the CODEC 12.

The series interface 13 transmits and receives in series a data with the PC 104 using a communication method of a RS-232 standard. The RF module 18 performs a multi-channel access(MCA) communication of 40 channels with the mobile telephone 103 by an analog method of 900 MHz.

The operation of the composite interface apparatus for a keyphone system according to the present invention will be explained with reference to the accompanying drawings.

Figure 1:
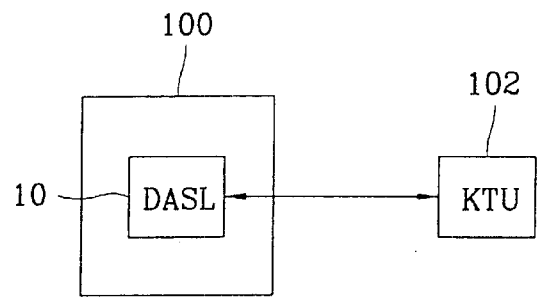
FIG. 1 is a block diagram illustrating a conventional keyphone system.
Figure 3A:
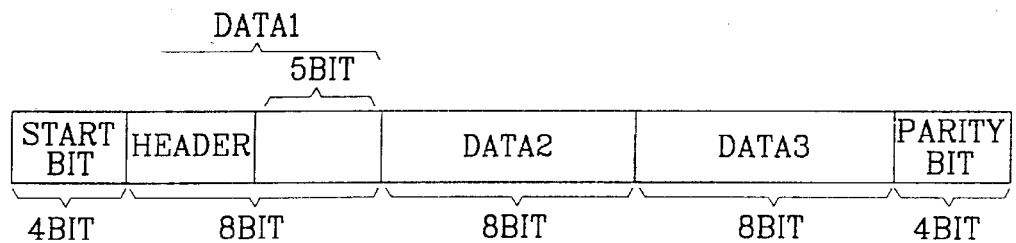
FIG. 3A is a view illustrating the formats of a data signal transmitted from a main apparatus to a multi-module and a data signal transmitted from a multi-module to a KTU, a PC and a mobile telephone.

The DASL 10 of the main apparatus 100 transmits a voice signal through a B-channel of the 2B+D channel using an AMI signal and outputs a data signal through a D-channel of the 2B+D channel in a format shown in FIG. 3A. At this time, the data signal is formed of a start bit of 4-bit, a DATA 1 of 8-bit, a DATA 2 and DATA 3 of 8-bit which is an actual data, and a parity bit of 4-bit for checking errors. In addition, the DATA 1 of 8-bit is formed of a header information of 3-bit and a data type(LCD, LED, voice control) information of 5-bit.

The DASL 11 of the multi-module 101 decodes an AMI signal transmitted from the main apparatus 100 through the B-channel and the D-channel, and the data signal of the D-channel is outputted to the CPU 14, and the voice signal of the B-channel is outputted to the CODEC 12 and is converted into an analog voice signal.

Therefore, the CPU 14 checks an availability of a data signal, a destination(KTU or mobile telephone), an error, etc. and determines an output path of a data signal and a voice signal. Namely, the CPU 14 checks a start bit of 4-bit of the data signal and judges an availability of an input data. At this time, if the start bit is set to "0101", it is judged that the data is valid.

The CPU 14 checks a header information of 3-bit included in DATA 1 and determines whether a data signal is transmitted to the KTU 102 or the mobile telephone 103 or the PC 104. Thereafter, the error check is performed using a parity bit of 4-bit.

TABLE 1

| Header information | Destination |
|---|---|
| 000 | PC |
| 010 | KTU |
| 001 | Mobile telephone |

Namely, the CPU 14 judges the destination of the data signal from the DASL 11 in accordance with a header information of three types shown in Table 1.

If the header information is "000", the CPU 14 outputs a data signal to the series interface 13 for thereby implementing a data communication between the series interface 13 and the PC 104 by a tone method based on the RS-232 standard. In addition, if the header information "010", the CPU 14 transmits the data signal to the DASL 15 and controls the analog switch 17 so that an analog voice signal of the CODEC 12 is inputted into the DASL 15 through the CODEC 16.

Therefore, the DASL 15 codes a data signal and a voice signal into an AMI signal and transmits to the KTU 102 for thereby implementing a wire-based voice communication. Namely, the DASL 15 transmits a voice signal through the B-channel of the 2B+D channel identically to the DASL 10, and the data signal is outputted through the D-channel of the 2B+D channel in a format shown in FIG. 3A.

In addition, if the header information is "001", the CPU 14 transmits a data signal to the RF module 18 and controls the analog switch 17 so that an analog voice signal from the CODEC 12 is inputted into the RF module 18. Therefore, the RF module 18 performs a wireless voice communication with the mobile telephone 103 by the MCA method.

When a user of the KTU 102 performs a voice communication to the main apparatus 100, the DASL 15 of the multi-module 101 decodes an AMI signal outputted from the DASL(not shown) of the KTU 102 and outputs a data signal to the CPU 14 and outputs a voice signal to the CODEC 16.

Figure 3B:
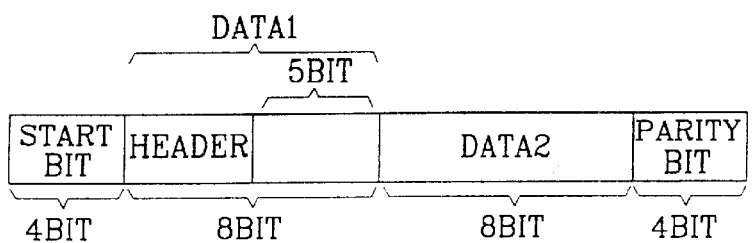
FIG. 3B is a view illustrating the formats of a data -signal transmitted from a multi-module to a main apparatus and a data signal transmitted from a KTU, a PC and a mobile telephone to a multi-module.

At this time, as shown in FIG. 3B, the format of the data transmitted from the KTU 102 to the main apparatus 100 is formed of a start bit of 4-bit, a DATA 1 of 8-bit, a DATA 2 of 8-bit which is an actual data, and a parity bit of 4-bit for checking errors. In addition, the DATA 1 of 8-bit is formed of a header of 3-bit which represents the type(KTU, mobile telephone and PC) of the terminal and a data of 5-bit which represents an ID of the terminal and multi-module 101. Therefore, in the case of the KTU 102, the data of 5-bit represents a KTU ID, for example, a LCD phone: 01, non-LCD phone:02, multi-module:03, and the DATA 2 represents a number of the KTU.

Therefore, the CPU 14 carries a header information "010" of the KTU 102 on a data outputted from the DASL 15 and outputs to the DASL 11 and controls the analog switch 107 so that an analog voice signal of the CODEC 16 is inputted into the DASL 11 through the CODEC 12. As a result, the DASL 15 codes the data signal and voice signal into an AMI signal and outputs to the main apparatus 100. At this time, the data signal is transmitted through one B-channel of the 2B channels in a format shown in FIG. 3B, and the voice signal is transmitted through the D-channel.

In addition, a user of the mobile telephone 103 performs a wireless voice communication to the main apparatus 100, the RF module 18 of the multi-module 101 is outputted to the CPU 14, and a voice signal is outputted to the analog switch 17. At this time, the 5-bit data except for the header in the DATA 1 represents an ID of the mobile telephone 103, and the DATA 2 represents an actual data such as a number of the mobile telephone 103 which will be called.

The CPU 14 carries a header information "001" of the mobile telephone 103 on a data signal outputted from the RF module 18 and controls the analog switch 17 so that an analog voice signal from the RF module 18 is inputted into the DASL 11.

Therefore, the DASL 15 codes an inputted data signal and a voice signal into an AMI signal, and the voice signal is outputted to the main apparatus 100 through the remaining B-channel of the 2B channel in the format of FIG. 3B, and the data signal is outputted to the main apparatus 100 through the D channel. Therefore, a user uses the KTU 102 and the mobile terminal 103 based on the multi-module 101.

In addition, in the case that a data is outputted from the PC 104 to the main apparatus 100, the data signal transmitted from the PC 104 is inputted into the CPU 14 through the series interface 13. The CPU 14 carries a header information "000" on a corresponding signal and outputs to the DASL 11. The DASL 11 outputs a data signal to the main apparatus 100 through the D channel. At this time, the 5-bit data except for the header in the DATA 1 represents a destination, and the DATA 2 represents an actual data. Therefore, a data communication is implemented between the PC 104 and the main apparatus 100.

The present invention is not limited to the above-disclosed embodiments. Under an environment that the ISDN(Integrated Service Digital Network) is widely used, and the communication ratio of the PC 104 is increased, a high speed data communication may be implemented by simply modifying a related software and hardware, so that the PC data is transmitted through the B channel.

As described above, in the present invention, a keyphone as well as a mobile telephone and a computer may be easily connected with the keyphone system through the multi-module, so that it is possible to implement a total solution for a voice communication, mobile communication and data communication.

In the present invention, since it is possible to easily perform a wireless communication and data communication by connecting a multi-module to the known keyphone system, it is easy to use the system, and the fabrication cost increase due to an additional apparatus is prevented.

In addition, since it is possible to perform a wire-based communication, wireless communication and data communication using one line, a reliability of a communication line is enhanced.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A composite interface apparatus for a key telephone system, comprising:
   at least one key telephone unit (KTU);
   a main apparatus for connecting the at least one KTU;
   a personal computer; and
   a multi-module for mutually interfacing a wire-based communication, a wireless communication or a data communication by connecting the main apparatus, the at least one KTU, a mobile telephone and a personal computer to one module, wherein said multi-module includes:
      first digital adapter subscriber loop (DASL) integrated circuit (IC) for transmitting and receiving a voice signal and data signal with the main apparatus in an alternate mark inversion (AMI) signal format;
      second digital adapter subscriber loop (DASL) integrated circuit (IC) for transmitting and receiving a voice signal and a data signal with the KTU in an alternate mark inversion (AMI) signal format;
      a radio frequency (RF) module for transmitting and receiving a high frequency signal with the mobile telephone;
      a serial interface for transmitting and receiving a data with the PC;
      first and second coder/decoder (CODEC) connected with the first and second DASL IC, respectively;
      an analog switch connected with the first and second CODEC and RF module for switching a voice signal; and
      a central processing unit (CPU) for searching a header information of a data signal outputted from the first DASL and controlling the analog switch.

2. The apparatus of claim 1, wherein a signal transmission between the multi-module and the mobile telephone is performed based on a MCA method of 40-channel.

3. The apparatus of claim 1, wherein said first and second DASL ICs transmit a voice signal through a B-channel using a 2B+D channel structure and transmit a data signal through a D-channel.

4. The apparatus of claim 1, wherein said first DASL IC allocates a voice signal of the KTU to one B-channel among the 2B+D channel and allocates a voice signal of the mobile telephone to the remaining one B-channel for thereby transmitting the signals to the main apparatus.

5. The apparatus of claim 1, wherein said analog switch switches a voice signal of the first CODEC to the second CODEC or the RF module in accordance with a control of the CPU or switches a voice signal of the RF module to the first CODEC.

6. The apparatus of claim 1, wherein said CPU carries a header information on each of the data signals from the second DASL IC, RF module and series interface and outputs the same to the first DASL IC for controlling the analog switch.

7. The apparatus of claim 1, wherein a data format transmitted from the main apparatus to the multi-module or from the multi-module to the KTU comprises:
   a start bit of 4-bit;
   a DATA 1 of 8-bit;
   a DATA 2 and DATA 3 of 8-bit which are actual data; and
   a parity bit of 4-bit for checking errors.

8. The apparatus of claim 7, wherein said DATA 1 is formed of
   a header of 3-bit which represents one among the KTU, mobile telephone and PC; and
   a data of 5-bit which represents a data type.

9. The apparatus of claim 1, wherein a data format transmitted from the multi-module to the main apparatus or from the KTU to the multi-module comprises:
   a start bit of 4-bit;
   a DATA 1 of 8-bit;
   a DATA 2 of 8-bit which is an actual data; and
   a parity bit of 4-bit for checking errors.

10. The apparatus of claim 9, wherein said DATA 1 is formed of:
    a header of 3-bit which represents one among the KTU, mobile telephone and PC; and
    a data of 5-bit which represents a KTU ID, an ID of the multi-module and a destination of the PC.

11. A multi function module for a key telephone system, comprising:
    first digital adapter subscriber loop (DASL) integrated circuit (IC) for transmitting and receiving a voice signal and a data signal with a main apparatus in an alternate mark inversion (AMI) signal format;
    second digital adapter subscriber loop (DASL) integrated circuit (IC) for transmitting and receiving a voice signal and a data signal with a key telephone unit (KTU) in an alternate mark inversion (AMI) signal format;
    a radio frequency (RF) module for transmitting and receiving a high frequency signal with a mobile telephone;
    a serial interface for transmitting and receiving data with a Personal Computer (PC);
    first and second coder/decoder (CODEC) connected with the first and second DASL ICs;

an analog switch connected between the first and second CODECs and the RF module for switching a voice signal of the first CODEC to the second CODEC and the RF module and switching the voice signals of the second CODEC and the RF module to the first CODEC; and a Central Processing Unit (CPU) for searching a header information of the data signal outputted from the first DASL IC, controlling the analog switch, carrying a header information on the data signals which are outputted from the second DASL IC, the RF module, and the serial interface to the first DASL IC.

12. The apparatus of claim 11, wherein said first and second DASL ICs transmit a voice signal through the B-channel using the 2B+D channel structure and transmits a data signal through the D-channel.

13. The apparatus of claim 11, wherein a data format transmitted from the main apparatus to the multi-module or from the multi-module to the KTU is formed of;

a start bit of 4-bit;

a DATA 1 of 8-bit;

a DATA 2 and DATA 3 of 8-bit which are an actual data; and a parity bit of 4-bit for checking errors.

14. The apparatus of claim 13, wherein said DATA 1 is formed of:

a header of 3-bit which represents one among the KTU, the mobile telephone and the PC; and a data of 5-bit which represents a data type.

15. The apparatus of claim 11, wherein a data format transmitted from the multi-module to the main apparatus or from the KTU to the multi-module is formed of:

a start bit of 4-bit;

a DATA 1 of 8-bit;

a DATA 2 of 8-bit which is an actual data; and a parity bit of 4-bit for checking errors.

16. The apparatus of claim 15, wherein said DATA 1 is formed of:

a header of 3-bit which represents one among the KTU, the mobile telephone and the PC; and a data of 5-bit which represents a KTU ID, an ID of a multi-module, and a destination of the PC.

17. A multi function module for a key telephone system, comprising:

first digital adapter subscriber loop (DASL) integrated circuit (IC) for transmitting and receiving a voice signal and a data signal with a main apparatus in a prescribed signal format;

second digital adapter subscriber loop (DASL) integrated circuit (IC) for transmitting and receiving a voice signal and a data signal with a key telephone unit (KTU) in a prescribed signal format;

a radio frequency (RF) module for transmitting and receiving a high frequency signal with a mobile telephone;

an interface for transmitting and receiving data with a Personal Computer (PC);

first and second converters connected with the first and second DASL ICs;

a switch connected between the first and second converters and the RF module for switching a voice signal of the first converter to the second converter and the RF module and switching the voice signals of the second converter and the RF module to the first converter; and a Central Processing Unit (CPU) for searching a header information of the data signal outputted from the first DASL IC, controlling the switch, carrying a header information on the data signals which are outputted from the second DASL IC, the RF module, and the interface to the first DASL IC.

* * * * *